(12) United States Patent
Ashbrook

(10) Patent No.: US 10,453,355 B2
(45) Date of Patent: Oct. 22, 2019

(54) METHOD AND APPARATUS FOR DETERMINING THE ATTENTIONAL FOCUS OF INDIVIDUALS WITHIN A GROUP

(71) Applicant: Nokia Corporation, Espoo (FI)

(72) Inventor: Daniel L. Ashbrook, Sunnyvale, CA (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 13/630,963

(22) Filed: Sep. 28, 2012

(65) Prior Publication Data

US 2014/0093848 A1 Apr. 3, 2014

(51) Int. Cl.
*G09B 19/00* (2006.01)

(52) U.S. Cl.
CPC .................... *G09B 19/00* (2013.01)

(58) Field of Classification Search
CPC ............ G09B 5/02; G09B 19/00; G09B 9/00
USPC ........................................................ 434/236
See application file for complete search history.

(56) References Cited

U.S. PATENT DOCUMENTS

| 5,676,138 | A | 10/1997 | Zawilinski |
| 5,942,954 | A | 8/1999 | Galiana et al. |
| 6,024,577 | A * | 2/2000 | Wadahama et al. .......... 434/322 |
| 6,301,571 | B1 | 10/2001 | Tatsuoka |
| 7,340,393 | B2 | 3/2008 | Mitsuyoshi |
| 7,561,143 | B1 | 7/2009 | Milekic |
| 7,881,493 | B1 * | 2/2011 | Edwards et al. .............. 382/103 |
| 8,473,343 | B2 | 6/2013 | Chalimadugu et al. |
| 9,335,825 | B2 * | 5/2016 | Rautiainen .............. G06F 3/017 |
| 2003/0022710 | A1 * | 1/2003 | DeMar .................... G07F 17/32 463/16 |
| 2005/0108092 | A1 * | 5/2005 | Campbell .............. A61B 3/113 705/14.64 |
| 2006/0109237 | A1 | 5/2006 | Morita |
| 2006/0281969 | A1 | 12/2006 | Wang et al. |
| 2007/0117083 | A1 * | 5/2007 | Winneg et al. ............... 434/350 |
| 2007/0214471 | A1 | 9/2007 | Rosenberg |
| 2008/0126179 | A1 | 5/2008 | Norfolk et al. |
| 2009/0322906 | A1 | 12/2009 | Watanabe |

(Continued)

FOREIGN PATENT DOCUMENTS

| EP | 2 063 767 A2 | 6/2009 |
| EP | 2 203 869 A1 | 7/2010 |

(Continued)

OTHER PUBLICATIONS

Office Action for U.S. Appl. No. 13/630,898 dated Oct. 5, 2016.
(Continued)

*Primary Examiner* — Timothy A Musselman
(74) *Attorney, Agent, or Firm* — Alston & Bird LLP

(57) ABSTRACT

A method, apparatus and computer program product are provided to effectively determine the attentional focus of each of a plurality of individuals, such as the members of a group. In the context of a method, information is received identifying an attentional focus of each of a plurality of individuals. The method also includes determining, with a processor, a relationship between a threshold and a number of individuals with an attentional focus having a predefined association with a location. Further, the method includes causing an action to be performed based upon the relationship.

19 Claims, 7 Drawing Sheets

(56) References Cited

U.S. PATENT DOCUMENTS

| | | |
|---|---|---|
| 2010/0004977 A1 | 1/2010 | Marci et al. |
| 2010/0099955 A1 | 4/2010 | Thomas et al. |
| 2011/0032378 A1 | 2/2011 | Kaneda |
| 2012/0105662 A1 | 5/2012 | Staudacher et al. |
| 2012/0194631 A1* | 8/2012 | Venolia .................. H04N 7/142 348/14.1 |
| 2014/0095109 A1 | 4/2014 | Ashebrook |
| 2016/0078285 A1* | 3/2016 | Malani ............... G06K 9/00295 345/629 |

FOREIGN PATENT DOCUMENTS

| | | |
|---|---|---|
| WO | WO 2008/030493 A1 | 3/2008 |
| WO | WO 2009/043927 A1 | 4/2009 |
| WO | WO 2009/056995 A1 | 5/2009 |
| WO | WO 2011/083092 A1 | 7/2011 |

OTHER PUBLICATIONS

Final Office Action for U.S. Appl. No. 13/630,898 dated Apr. 14, 2017, 13 pages.

Crane, E. et al., *Concurence of Facial and Bodily Expression: A Feasible Study*, Research Paper, University of Michigan (2006) 4 pages.

Heidenburg, B. et al., *Gaze Tracking System*, IRALAR Project Proposal (Dec. 2007) 19 pages.

Lyons, M. J., *The Mouthesizer: A Facial Gesture Musical Interface*, Electronic Arts and Animation Catalog (Jun. 2001) p. 230.

Reddy, C., *A Non-obtrusive Head Mounted Face Capture System*, Thesis—Michigan State University, Department of Computer Science and Engineering (2003) 99 pages.

DSC-H70 | Smile Shudder | Cyber-shot User Guide, [online] [retrieved Aug. 10, 2016]. Retrieved from the Internet; URL: http://docs.esupport.sony.com/dvimag/DSCH70_guide/eng/contents/03/04/03/03.html. (2011) 2 pages.

HappyShutter—Smile detection—Android-sovellukset Google Playssa, [online] [retrieved Aug. 10, 2016]. Retrieved from the Internet; URL: http://play.google.com/store/apps/details?id=co.thirdsight.happyshutter&hI=fi>. (2016) 2 pages.

Office Action for U.S. Appl. No. 13/630,898 dated Apr. 17, 2014.
Office Action for U.S. Appl. No. 13/630,898 dated Oct. 20, 2014.
Office Action for U.S. Appl. No. 13/630,898 dated Jul. 30, 2015.
Office Action for U.S. Appl. No. 13/630,898 dated Mar. 21, 2016.

* cited by examiner

METHOD AND APPARATUS FOR DETERMINING THE ATTENTIONAL FOCUS OF INDIVIDUALS WITHIN A GROUP

TECHNOLOGICAL FIELD

An example embodiment of the present invention relates generally to the determination of the attentional focus of individuals within a group and, more particularly, to the performance of an action based at least in part upon the attentional focus of individuals within a group.

BACKGROUND

Individuals may focus their attention upon various objects. Further, the attentional focus of an individual may change over time, sometimes relatively frequently, as the individual initially focuses their attention on a first object and then subsequently refocuses their attention on a second object. Particularly in a group, it may be difficult to determine the attentional focus of members of the group, either individually or in the aggregate.

It may sometimes be desirable to determine the attentional focus of the individuals of a group. For example, it may be useful to determine that every member of a group was focusing their attention upon a camera in advance of capturing an image of the group. As another example, in an instance in which a plurality of guards are monitoring a particular object or a predefined location, it may be useful to determine that each of guards or at least a certain number or percentage of the guards had their attentional focus upon the particular object or location to ensure that the appropriate security was being provided. As yet another example, it may be useful to understand the attentional focus of the individuals within a group when confronted with a plurality of advertisements or other marketing materials in order to gauge the effectiveness of the advertisements and other marketing materials. However, the difficulties associated with determining the attentional focus of an individual within a group may make it difficult to provide such information.

BRIEF SUMMARY

A method, apparatus and computer program product are provided in accordance with an example embodiment of the present invention in order to effectively determine the attentional focus of each of a plurality of individuals, such as the members of a group. As such, the method, apparatus and computer program product of an example embodiment may cause an action to be performed at least partially based upon the attentional focus of each of the plurality of individuals. Consequently, the action which is therefore caused to be performed may produce improved or more effective results as a result of the consideration of the attentional focus of each of the plurality of individuals.

In one embodiment, a method is provided that includes receiving information identifying an attentional focus of each of a plurality of individuals, such as by receiving head position information for each of the plurality of individuals. For example, the method may receive information identifying an attentional focus by receiving information from a wearable device worn by each of the plurality of individuals. The method also includes determining, with a processor, a relationship between a threshold and a number of individuals with an attentional focus having a predefined association with a location. Further, the method includes causing an action to be performed based upon the relationship.

The method of one embodiment determines a relationship by determining a relationship between a minimum threshold and the number of individuals with an attentional focus that includes the location. In this embodiment, the method may cause an action to be performed by causing the action to be performed in response to the number of individuals with an attentional focus that includes the location being at least as great as the minimum threshold. In this embodiment, the action that is caused to be performed may be the capture of an image of the location or the capture of at least some of the plurality of individuals. The method of another embodiment determines a relationship by determining a relationship between a maximum threshold and the number of individuals with an attentional focus that fails to include the location. In this embodiment, the method may cause an action to be performed by causing the action to be performed in response to the number of individuals with an attentional focus that fails to include the location being at least as great as the maximum threshold. In this embodiment, the action that is caused to be performed may be an action that is performed to draw the attentional focus of at least some of the individuals to the location.

In another embodiment, an apparatus is provided that includes at least one processor and at least one memory including computer program code with the at least one memory and the computer program code configured to, with the processor, cause the apparatus to at least receive information identifying an attentional focus of each of a plurality of individuals. The at least one memory and the computer program code are also configured to, with the processor, cause the apparatus to determine a relationship between a threshold and a number of individuals with an attentional focus having a predefined association with a location. Further, the at least one memory and the computer program code are configured to, with the processor, cause the apparatus to cause an action to be performed based upon the relationship.

The at least one memory and the computer program code may be configured to, with the processor, cause the apparatus of one embodiment to determine a relationship by determining a relationship between a minimum threshold and the number of individuals with an attentional focus that includes the location. In this embodiment, the at least one memory and the computer program code may be configured to, with the processor, cause the apparatus to cause an action to be performed by causing the action to be performed in response to the number of individuals with an attentional focus that includes the location being at least as great as the minimum threshold. In this embodiment, the action that is caused to be performed may be the capture of an image of the location or the capture of at least some of the plurality of individuals. The at least one memory and the computer program code may be configured to, with the processor, cause the apparatus of another embodiment to determine a relationship by determining a relationship between a maximum threshold and the number of individuals with an attentional focus that fails to include the location. In this embodiment, the at least one memory and the computer program code may be configured to, with the processor, cause the apparatus to cause an action to be performed by causing the action to be performed in response to the number of individuals with an attentional focus that fails to include the location being at least as great as the maximum threshold. In this embodiment, the action that is caused to be performed may be an action that is performed to draw the attentional focus of at least some of the individuals to the location.

In a further embodiment, a computer program product is provided that includes at least one non-transitory computer-readable storage medium having computer-executable program code portions stored therein with the computer-executable program code portions including program code instructions for receiving information identifying an attentional focus of each of a plurality of individuals. The computer-executable program code portions also include program code instructions for determining a relationship between a threshold and a number of individuals with an attentional focus having a predefined association with a location. Further, the computer-executable program code portions include program code instructions for causing an action to be performed based upon the relationship.

The program code instructions for determining a relationship in accordance with one embodiment may include program code instructions for determining a relationship between a minimum threshold and the number of individuals with an attentional focus that includes the location. In this embodiment, the program code instructions for causing an action to be performed may include program code instructions for causing the action to be performed in response to the number of individuals with an attentional focus that includes the location being at least as great as the minimum threshold. In this embodiment, the action that is caused to be performed may be the capture of an image of the location or the capture of at least some of the plurality of individuals. The program code instructions for determining a relationship in accordance with another embodiment may include program code instructions for determining a relationship between a maximum threshold and the number of individuals with an attentional focus that fails to include the location. In this embodiment, the program code instructions for causing an action to be performed may include program code instructions for causing the action to be performed in response to the number of individuals with an attentional focus that fails to include the location being at least as great as the maximum threshold. In this embodiment, the action that is caused to be performed may be an action that is performed to draw the attentional focus of at least some of the individuals to the location.

In yet another embodiment, an apparatus is provided that includes means for receiving information identifying an attentional focus of each of a plurality of individuals. The apparatus also includes means for determining a relationship between a threshold and a number of individuals with an attentional focus having a predefined association with a location. Further, the apparatus includes means for causing an action to be performed based upon the relationship.

BRIEF DESCRIPTION OF THE DRAWINGS

Figure 1:
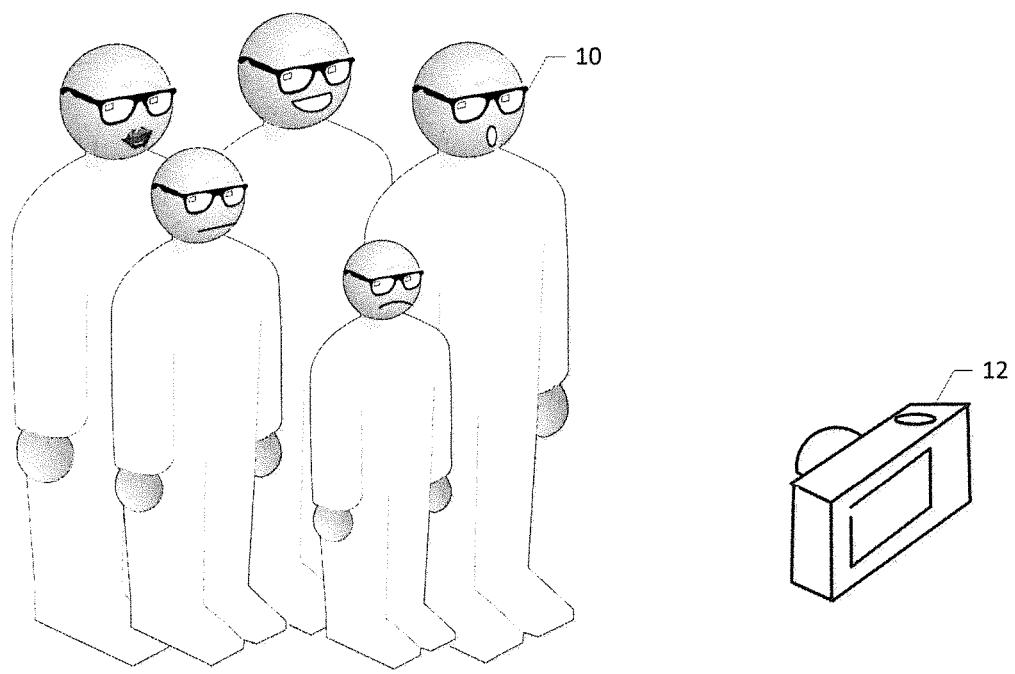
Figure 2:
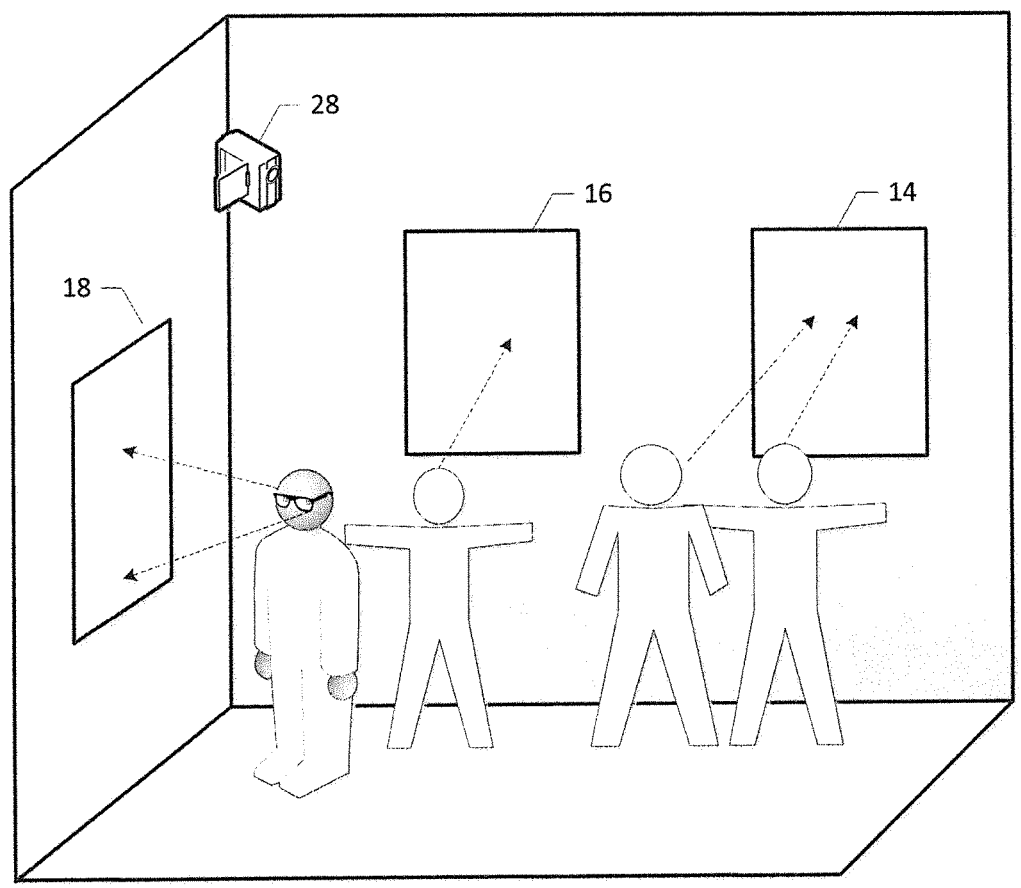

Having thus described certain embodiments of the present invention in general terms, reference will now be made to the accompanying drawings, which are not necessarily drawn to scale, and wherein:

FIG. 1 is an illustration of a plurality of individuals, each exhibiting an emotional response and having an attentional focus;

FIG. 2 is an illustration of a plurality of individuals, some of which have a different attentional focus.

Figure 3:
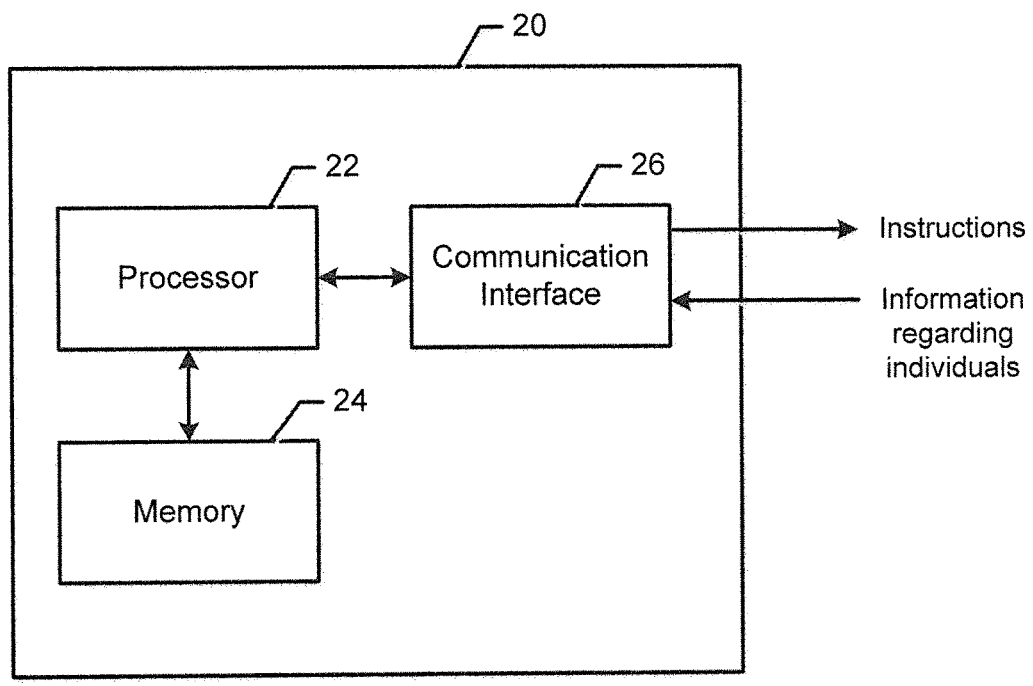
Figure 4:
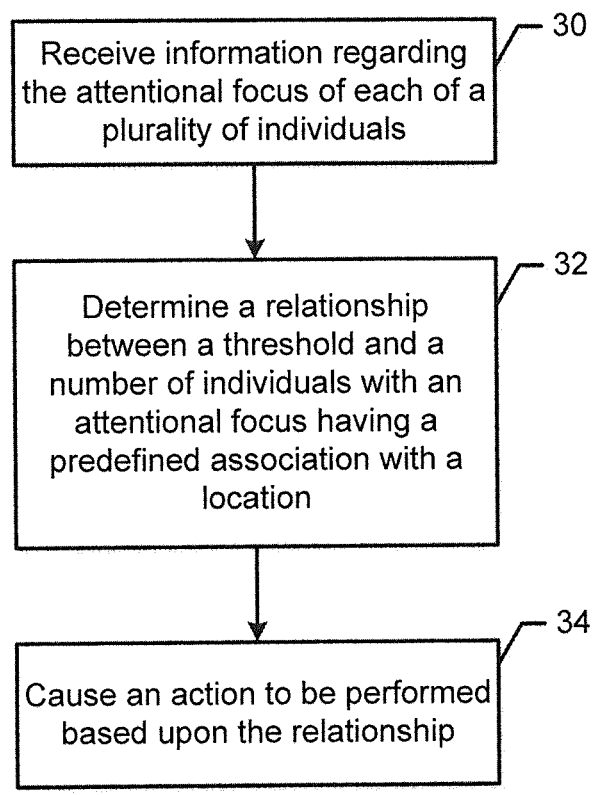
Figure 5:
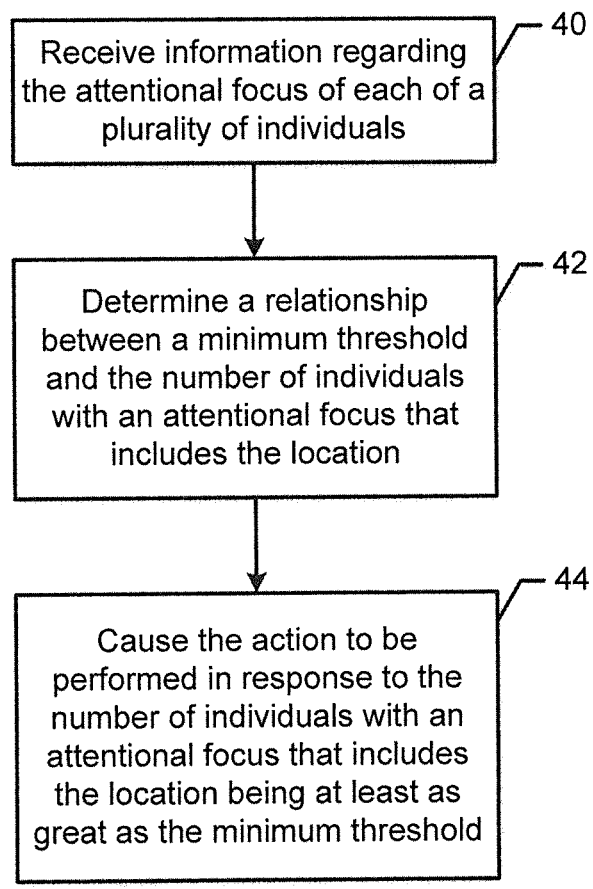
Figure 6:
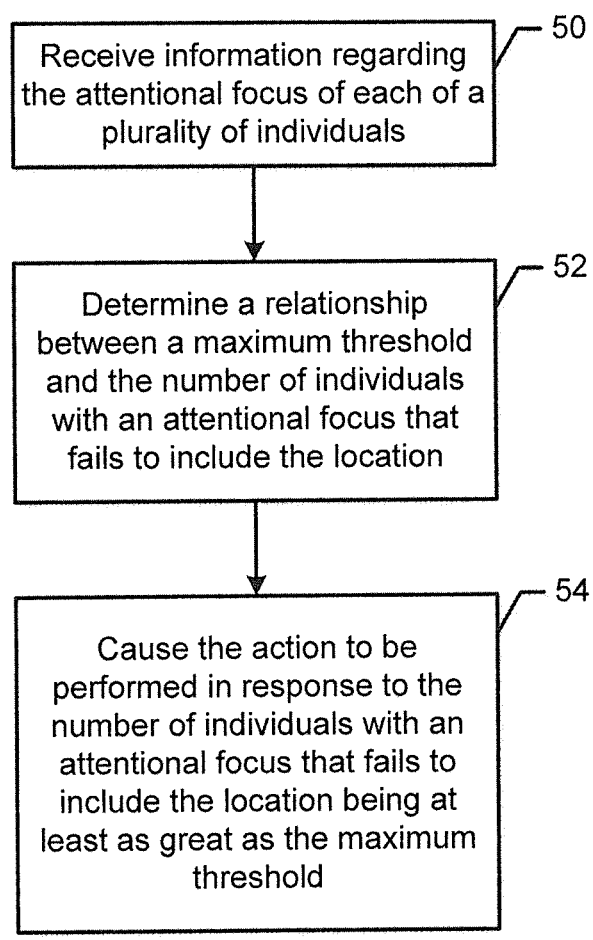
Figure 7:
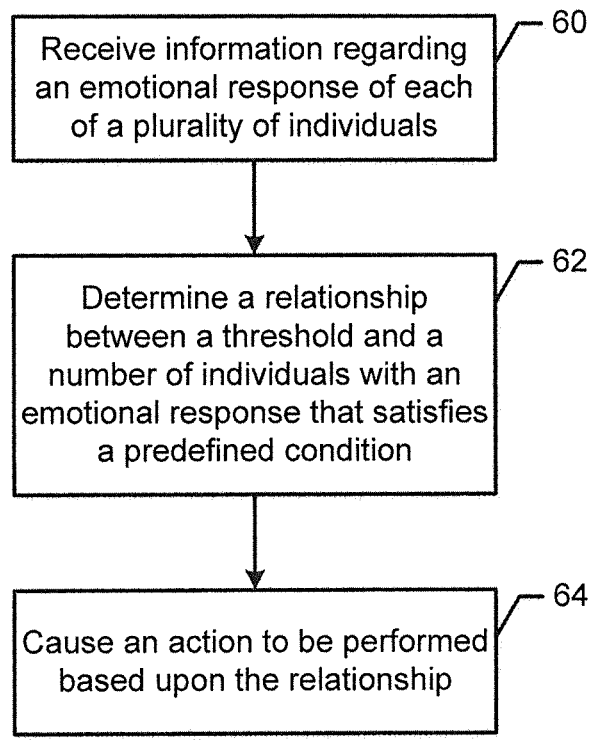

FIG. 3 is a block diagram of an apparatus that may be specifically configured in accordance with an example embodiment of the present invention;

FIG. 4 is a flowchart illustrating the operations performed, such as by the apparatus of FIG. 3, in order to cause an action to be performed based upon the attentional focus of at least some individuals in accordance with an example embodiment of the present invention;

FIG. 5 is a flowchart illustrating the operations performed, such as by the apparatus in FIG. 3, in order to cause an action to be performed in response to at least a threshold number of individuals having an attentional focus that includes a location in accordance with an example embodiment of the present invention;

FIG. 6 is a flowchart illustrating the operations performed, such as by the apparatus in FIG. 3, in order to cause an action to be performed in response to at least a threshold number of individuals failing to pay attention to a location in accordance with an example embodiment of the present invention; and FIG. 7 is a flowchart illustrating the operations performed, such as by the apparatus in FIG. 3, in order to cause an action to be performed based at least in part upon the emotional response of at least some of a plurality of individuals in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

Referring now to FIG. 1, a plurality of individuals are depicted. The individuals may be members of a group, such as a group of family members, a group of business acquaintances, a tour group, etc. Alternatively, the individuals may be unaffiliated with one another, but may be located proximate to one another, such as by being within the same room, by being within a predefined distance of one another or the like. Regardless, the individuals are generally proximate one another as shown in FIG. 1. The individuals may be located in a variety of settings and may be engaged in various activities. For example, the individuals may be visitors in a museum, gallery or exhibit, may be attendees at a performance, such as a concert, may be customers at a restaurant, may be security guards policing a particular object or location, or the like.

Each individual may have an attentional focus and an emotional response. The attentional focus of an individual is the object, location or the like upon which the individual is focusing their attention. The attentional focus of an individual may be determined in various manners including being determined based upon the position of the individual's head and, more particularly, based upon the direction in which the individual is gazing. The emotional response of an individual is the outward or public manifestation of the emotional state of an individual, such as represented by a smile, laughter, furrowing of the eyebrows, wrinkling of the nose or the like.

With respect to attentional focus, FIG. 2 depicts a scenario in which four individuals are located proximate one another, such as within a room of an art gallery. As shown by the dashed lines, two individuals have the same attentional focus upon painting 14 as a result of their looking at the painting. As also shown by the dashed lines, the other individuals have their attentional focus upon different locations with one individual having their attentional focus upon painting 16 and another individual having their attentional focus upon painting 18.

In the illustrated embodiment, each of the plurality of individuals is wearing a wearable device and, more particularly, ahead-worn device, such as a head mounted display, headphones or ear buds, that may include one or more sensors for providing information regarding the attentional focus or emotional response of the individual. While each of the foregoing examples may be capable of providing output, the wearable device of other embodiments need not provide output. Additionally, while the foregoing examples are of head-worn devices, the wearable device may be worn by other portions of an individual's body, such as a pendant. For the purposes of illustration, but not of limitation, the method, apparatus and computer program product of an example embodiment will be described below in conjunction with a head mounted device, although the method, apparatus and computer program product may be employed in conjunction with other types of wearable devices in other embodiments. In the illustrated embodiment, the head mounted displays 10 are in the form of a pair of glasses. However, the head mounted display may be embodied in other forms including a head mounted visor or a helmet manner display. For example, the head mounted display may be in a form of a helmet worn by a motorcyclist, a pilot or they like. Regardless of the manner in which the head mounted display is embodied, the head mounted display permits a user to view their surroundings, while also permitting information to be presented to the user, thereby augmenting the user's view of their surroundings. The information presented by the head mounted display may augment the objects in the scene viewed through the head mounted display, such as by identifying or otherwise providing more information regarding one or more of the objects viewed through the head mounted display. Alternatively, the information presented by the head mounted display may be unrelated to the objects in the scene viewed through the head mounted display, but may otherwise provide information that may be of interest to the user. Regardless of the type of information presented by the head mounted display, a head mounted display as exemplified by the glasses may support augmented reality and other applications.

As shown in FIG. 3, an apparatus 20 that may be specifically configured in accordance with an example embodiment of the present invention is illustrated. The apparatus may be embodied in one or more of the head mounted displays 10 worn by the individuals. Alternatively, the apparatus may be embodied by a computing device that is remote from the head mounted display, but that is in communication therewith, such as via wireless communication, e.g., via Bluetooth communication, Wi-Fi or another wireless network, or via wired communication. For example, a computing device, such as a personal digital assistant (PDA), mobile telephone, smartphone, pager, mobile television, gaming device, laptop computer, camera, tablet computer, touch surface, video recorder, audio/video player, radio, electronic book, positioning device (e.g., global positioning system (GPS) device), or any combination of the aforementioned, and other types of voice and text communications systems, may embody the apparatus of one embodiment. Regardless of the manner in which the apparatus is embodied, the head mounted display of each individual may be configured to communicate information identifying the individual's attentional focus to another device, such as to the other head mounted displays worn by other individuals in an instance in which the apparatus is distributed between the plurality of head mounted displays or to an external computing device that may embody the apparatus in another embodiment.

Regardless of the manner in which the apparatus 20 is embodied, the apparatus may include or otherwise be in communication with a processor 22, a memory device 24 and a communication interface 26. It should be noted that while FIG. 3 illustrates one example of a configuration of an apparatus for receiving and responding to user input, numerous other configurations may also be used to implement embodiments of the present invention. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

In some embodiments, the processor 22 (and/or co-processors or any other processing circuitry assisting or otherwise associated with the processor) may be in communication with the memory device 24 via a bus for passing information among components of the apparatus. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus 20 to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by a computing device, such as a head mounted display 10 or a computing device in communication with the head mounted display, configured to employ an example embodiment of the present invention. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a head mounted display) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

Meanwhile, the communication interface 26 may be any means such as a device or circuitry embodied in either hardware or a combination of hardware and software that is configured to receive and/or transmit data from/to a head mounted display 10, such as a computing device embodied by the head mounted display, in an embodiment in which the apparatus 20 is remote from the head mounted display. Additionally, the communication interface may be configured to communicate with other components of the computing device in an instance in which the apparatus is embodied by a computing device embodied by the head mounted display or with a remote computing device in an instance in which the apparatus is separate from the head mounted display.

In this regard, the communication interface 26 may include, for example, an antenna (or multiple antennas) and supporting hardware and/or software for enabling communications wirelessly. Additionally or alternatively, the communication interface may include the circuitry for interacting with the antenna(s) to cause transmission of signals via the antenna(s) or to handle receipt of signals received via the antenna(s). For example, the communications interface may be configured to communicate wirelessly with the head mounted displays 10, such as via Wi-Fi, Bluetooth or other wireless communications techniques. In some instances, the communication interface may alternatively or also support wired communication. As such, for example, the communication interface may include a communication modem and/or other hardware/software for supporting communication via cable, digital subscriber line (DSL), universal serial bus (USB) or other mechanisms. For example, the communication interface may be configured to communicate via wired communication with other components of the computing device including, for example, other components of the head mounted display in an embodiment in which the apparatus 20 is embodied by the head mounted display.

Referring now to FIG. 4, the operations performed, such as by the apparatus 20 of FIG. 3, in order to cause an action to be performed based at least in part upon the attentional focus of at least some of the individuals are depicted. In this regard, depending upon the attentional focus of some of the individuals, different actions may be caused to be performed, thereby tailoring the action to the attentional focus of the individuals such that the resulting action may be more effective.

As shown in FIG. 3 and with reference to block 30 of FIG. 4, the apparatus 20 may receive information identifying the attentional focus of each of a plurality of individuals. The apparatus may therefore include means, such as the processor 22, communication interface 26 or the like, for receiving the information identifying the attentional focus of each of the plurality of individuals. The attentional focus of the individuals may be determined in various manners and, as such, the apparatus, such as the processor, the communication interface or the like, may receive the information identifying the attentional focus in various manners and from various devices.

In one example, the information identifying the attentional focus of an individual may be head position information. Consequently, the position of an individual's head may be tracked. For example, a digital compass may be carried by the user's head, such as by including a digital compass within the head mounted display 10 worn by the individual, with the digital compass configured to provide the apparatus with head position information. In one embodiment, the location of the individual may also be determined, such as by a global positioning system (GPS). For example, a head mounted display may also include a GPS for providing the location information. As such, the apparatus 20, such as the processor 22, communication interface 26 or the like, of one embodiment may receive the information identifying the attentional focus of an individual in the form of head position information as well as, in one embodiment, information identifying the location of the individual, such as from a head mounted display worn by the individual. Based upon the position of the individual's head and, in some embodiments, also based upon the location of the individual, the apparatus, such as the processor, may determine the attentional focus of the individual. As another example, a camera may be carried by the individual, such as by including the camera within the head mounted display. The camera of this embodiment may be configured to capture images that include one or more predefined features in the environment, such as one or more ceiling-mounted visual markers, that permit the position and orientation of the individual's head and, therefore, the individual's attentional focus to be tracked.

Additionally or alternatively, the gaze of an individual may be tracked, such as with a gaze tracker carried, for example, by the head mounted display 10 and configured to monitor the movement and behavior of the individual's eyes. In this embodiment, the apparatus 20, such as the processor 22, the communication interface 26 or the like, may therefore receive information identifying the direction in which the individual is gazing from a respective gaze tracker. Thus, the attentional focus of the individual may be determined by the apparatus, such as the processor, based upon the gaze of the individual.

Still further, one or more cameras, such as camera 28 of FIG. 2, may capture images of the plurality of individuals. As such, the apparatus, such as the processor, communication interface or the like, may receive information, such as images, from one or more cameras such that the direction and orientation of the individuals' heads and bodies may be referenced in order to determine the direction in which the individuals are looking, thereby defining the attentional focus of the individuals. In one embodiment, one or more environmental cameras, such as camera 28 of FIG. 2, monitor everyone in a room. The images captured by the environmental cameras may be provided to a central computing device which processes the images and correlates between each camera to obtain an overall picture of where individuals are looking, thereby identifying the attentional focus of the individuals. Or, each individual may have one or more wearable cameras which may, for example, be included in the head-mounted display. In this embodiment, the head-mounted cameras may track the gaze or head direction of the people around them. The head-mounted cameras may provide the images to a central computing device for a determination of the attentional focus of each individual. As described by some of the foregoing examples, the information identifying the attentional focus of an individual may be provided by an external device, that is, a device that is physically separate from the individual whose attentional focus is identified. For example, a camera, such as camera 28 of FIG. 2, is external to the individuals, but may provide information identifying the attentional focus of an individual.

In each of the foregoing embodiments, the attentional focus may be determined, such as by the head mounted display 10, prior to the provision of information to the apparatus 20 such that the information that is received by the apparatus explicitly identifies the attentional focus of each of the individuals. Alternatively, the information received by the apparatus identifying the attentional focus of each individual may be the more granular information that was collected, such as information identifying the position of the individual's head, the location of the individual, the gaze of the individual or the like, such that the apparatus, such as the processor 22, may thereafter determine the attentional focus of each individual based upon the information that was received.

The apparatus 20 of one embodiment, such as the processor 22, may determine the attentional focus of an individual even in an instance in which the individual is fully or partially obscured from a view from apparatus 20. Indeed, the apparatus of this embodiment may provide for a distributed attentional focus determination as distinguished, for example, from a centralized gaze tracking solution in which the apparatus relies upon information regarding the attentional focus of the individuals that is obtained from a single camera or a single gaze tracker and which is therefore limited to the determination of the individuals that can be perceived. However, an apparatus that provides for a distributed attentional focus determination may receive information regarding the attentional focus of an individual from another device, such as a head mounted display of the individual, such that the attentional focus of the individual may be determined even if the individual is fully or partially obscured from the view of the apparatus.

Referring now to block 32 of FIG. 4, the apparatus 20 may be configured to determine a relationship between a threshold, such as a minimum threshold or a maximum threshold, and the number of individuals with an attentional focus having a predefined association with a location. Thus, the apparatus may include means, such as the processor 22 or the like, for determining the relationship between the threshold and the number of individuals with an attentional focus having a predefined association with the location. The predefined association of the attentional focus with the location may be defined in various manners. In one embodiment, for example, the attentional focus may have a predefined association with the location in an instance in which the attentional focus includes the location. In another embodiment, the attentional focus may have a predefined association with the location in an instance in which the attentional focus fails to include the location, that is, in an instance in which the attentional focus is directed somewhere different than the location. In a further embodiment, the attentional focus may have a predefined association with the location in an instance in which the duration of the attentional focus upon the location satisfies a threshold, such as by having at least a predefined duration, thereby indicating that the individual is paying substantial attention to the location. In yet another embodiment, the attentional focus may have a predefined association with the location in an instance in which the attentional focus is proximate the location, such as within a predefined angular or distance range of the location, even though the individual my not be staring directly at the location.

The location that is considered in determining whether the attentional focus of an individual has a predefined association therewith may be determined in various manners. For example, the location may be predetermined, such as the location of an object that is to be secured by a plurality of guards, the location of a particular performer upon stage, the location of a camera or the like. However, the location need not be predetermined and may, instead, be determined based upon the location to which all or at least a certain number or percentage of the individuals either direct their attentional focus or fail to direct their attentional focus, as explained below.

Referring now to block 34 of FIG. 4, the apparatus 20 may also cause an action to be performed based upon the relationship. Thus, the apparatus may include means, such as the processor 22, the communication interface 26 or the like, for causing an action to be performed based upon the relationship, such as by transmitting an instruction to another device to cause the action to be performed as shown in FIG. 3. In one embodiment, the relationship may be expressed in terms of the number of individuals with an attentional focus having a predefined association with a location exceeding a threshold, equaling the threshold or being less than the threshold. The threshold may be defined in various manners including a number of individuals, a percentage of individuals or the like. As such, the apparatus of one embodiment may cause an action to be performed in an instance in which the number of individuals with an attentional focus having a predefined association with a location is at least as great as the threshold, while in an another embodiment, the apparatus may be configured to cause the action to be performed in an instance in which the number of individuals with an attentional focus having a predefined association with a location is less than the threshold.

By way of an example and with reference to FIG. 5, the apparatus 20, such as the processor 22, communication interface 26 or the like, may receive information identifying an attentional focus of each of a plurality of individuals as described above in conjunction with block 30 of FIG. 4. See block 40. In this embodiment, the apparatus, such as the processor or the like, also determines a relationship between a minimum threshold and the number of individuals with an attentional focus that includes a location. See block 42 of FIG. 5. The minimum threshold may be defined in various manners including a number of individuals, a percentage of individuals or the like. In this embodiment, the apparatus, such as a processor, the communication interface or the like, may then cause the action to be performed in response to the number of individuals with an attentional focus that includes the location being at least as great as the minimum threshold. See block 44. The action that is caused to be performed may vary depending upon the situation. In one embodiment, however, an image of the location may be captured, such as by a head-worn or otherwise body-worn camera or a camera 28 located elsewhere in the room, in response to determining that the number of individuals with an attentional focus that includes the location is at least as great as the minimum threshold since the common attentional focus may indicate that something interesting is occurring at the location. Additionally or alternatively, an image of at least some of the plurality of individuals may be captured. With reference to FIG. 1, for example, a camera 12 may capture an image of the individuals once the apparatus determines that a least a threshold number of the individuals have an attentional focus that includes the camera, thereby insuring that at least some and, in some instances, all of the individuals are facing the camera.

By way of another embodiment, reference is now made to FIG. 6 in which the apparatus 20, such as the processor 22, communication interface 26 or the like, is again configured to receive information identifying an attentional focus of each of a plurality of individuals. See block 50. In this embodiment, the apparatus, such as the processor, is configured to determine a relationship between a maximum threshold and the number of individuals with an attentional focus that fails to include the location, such as represented by individuals having an attentional focus on a different location. See block 52. As such, in block 54 of FIG. 6, the apparatus, such as the processor, the communication interface or the like, may also be configured to cause the action to be performed in response to the number of individuals with an attentional focus that fails to include the location being at least as great as the maximum threshold. In this embodiment, the action is therefore caused to be performed in an instance in which it is determined that a number of individuals are not paying attention to the location. In one example embodiment, in the apparatus, such as the processor, the communication interface or the like, may cause an action to be performed that serves to draw the attentional focus of at least some of the individuals to the location, such as by shining a brighter light upon the location, advertising or promoting the location, causing an announcement to be issued to one or more of the individuals regarding the location, highlighting the location via an overlay or other indicia, such as a visual attractant, presented by the individual's head mounted display or the like. In a more detailed example in which a plurality of guards are to be securing an object at a particular location, the action that is caused to be performed in response to determining that fewer than a threshold number of the guards have the particular location within their attentional focus may be the issuance of a notification, such as an email, a text message, an automated voice recording, a personal visit from their supervisor, the presentation of indicia, such as a visual attractant, by the head mounted display of the guards or the like, advising the guards to pay additional attention to the object that is being secured. Although the notification may be issued to all of the individuals, the apparatus, such as the processor, of another embodiment may cause the notification to only be issued to certain individuals, such as the individuals closest to the location, with the other individuals being excluded from receipt of the notification. In addition to or instead of causing a notification to be issued, an image of the individuals, such as the guards, may be captured to evidence the failure to pay attention to a particular location and/or an image of the location that does serve as the attentional focus of the individuals so as to determine what distracted the individuals from the location that was intended to be their attentional focus.

As described above, the apparatus 20 may cause various actions to be performed in accordance with embodiments of the present invention. In one embodiment, the action that is performed may be the provision of information regarding the attentional focus of the plurality of individuals. As a more particular example, the attentional focus of a plurality of audience members may be determined and information regarding the attentional focus of the audience members may be provided, such as in the form of real time or near real time feedback. Based upon the feedback, one or more aspects of the performance may be altered, such as by shining a brighter light upon a particular performer who is failing to attract the attentional focus of a sufficient number of audience members or by de-emphasizing another performer, such as by reducing the lighting on the other performer, who is garnering an excessive amount of attention from the audience members. In this embodiment, the apparatus may utilize different thresholds in the determination as to whether an action is to be performed with the threshold being varied based upon various parameters, such as proximity to the location, object to be viewed at the location, etc.

In another example embodiment, the disbursement of guests within a museum, gallery or other exhibit may be monitored and announcements or other suggestions may be provided by the management of the museum, gallery or other exhibit in an instance in which an excessive number of individuals have their attentional focus upon a particular work, thereby resulting in the overcrowding of the region surrounding the work, or in an instance in which an unexpectedly small number of individuals are viewing another work. As the foregoing examples demonstrate, the method and apparatus may cause many of a wide variety of actions to be performed in response to a determination of the relationship between the threshold and a number of individuals with an attentional focus having a predefined association with a location.

In addition to or instead of considering the attentional focus of each of a plurality of individuals, the method, apparatus and computer program product of an example embodiment may consider the emotional response of each of a plurality of individuals, such as by considering the outward emotional response representative of the current emotional state of each of a plurality of individuals. As shown in FIG. 7, the operations performed by an apparatus 20, such as shown in FIG. 3, in accordance with an example embodiment in which various actions are caused to be performed at least partially in response to the emotional response of each of a plurality of individuals are illustrated. In this regard, the apparatus is configured to receive information identifying an emotional response of each of a plurality of individuals. See block 60. Thus, the apparatus may include means, such as the processor 22, the communication interface 26 or the like, for receiving information identifying the emotional response of each of a plurality of individuals.

The emotional response of an individual may be determined in various manners and, as such, the apparatus 20 may receive the information identifying the emotional response in a variety of manners from various devices. By way of example, a capacitive sensor may track changes in the shape of the user's face, thereby permitting various facial expressions, such as a smile or a grimace, to be identified. The capacitive sensor may be proximate the user's face and, in one embodiment, is carried by or included within the head mounted display 10 worn by the individual. Additionally or alternatively, a microphone and an associated audio processor may be configured to detect audible responses, such as laughter or a groan, and, in some embodiments, to perform voice analysis upon the audible responses. In this embodiment, a head mounted display may include the microphone and, in some embodiments, the associated audio processor. Further, a physiological sensor may monitor physiological signals which may, in turn, be representative of an emotional response of an individual. For example, an electroencephalographic (EEG) sensor may detect brain waves which, in turn, may be indicative of the emotional response of an individual. In this embodiment, the EEG sensor(s) may be incorporated within the head mounted display worn by the individual. Additionally or alternatively, a sensor may be carried by a head mounted display or more generally by a hat or by eyeglasses with the sensor being responsive to a change in the position of the individual's eyebrows. As such, the sensor of this embodiment may provide information indicative of the individual's eyebrows being raised or being furrowed. Still further, an image of the individual could be captured and image processing techniques may be employed to determine if the individual is smiling, grimacing or otherwise displaying a particular emotional response. While any one of the sensors may be used individually to provide information indicative of an individual's emotional response, combinations of the sensors may be employed in order to determine even more complex emotion responses of the user.

Regardless of the manner in which the information identifying the emotional response of an individual is collected, the apparatus 20, such as the processor 22, the communication interface 26 or the like, is configured to receive the information identifying the emotional response. In this regard, the information identifying the emotional response that is received by the apparatus may be information collected, such as by a sensor, from the individual that may, in turn, be analyzed by the apparatus, such as a processor, in order to determine the emotional response of the individual. Alternatively, the emotional response of the individual may be determined based upon the information that has been collected prior to the provision of the information to the apparatus such that the information that is subsequently provided to the apparatus more explicitly defines the emotion response of the individual. In yet another embodiment, the information identifying the emotional response that is received by the apparatus may be information identifying the emotional state of an individual, such as in a distributed embodiment as described below in which the individual may not be within view of the apparatus.

The apparatus 20 of one embodiment, such as the processor 22, may determine the emotional response of an individual even in an instance in which the individual is fully or partially obscured from a view from apparatus 20. Indeed, the apparatus of this embodiment may provide for a distributed emotional response determination as distinguished, for example, from a centralized solution in which the apparatus relies upon information regarding the emotional response of the individuals that is obtained from a single camera or a single sensor and which is therefore limited to the determination of the individuals that can be perceived. However, an apparatus that provides for a distributed emotional response determination may receive information regarding the emotional response of an individual from another device, such as a head mounted display of the individual, such that the emotional response of the individual may be determined even if the individual is fully or partially obscured from the view of the apparatus.

Referring now to block 62 of FIG. 7, the apparatus 20 may also be configured to determine a relationship between a threshold, such as a maximum threshold or a minimum threshold, and a number of individuals with an emotional response that satisfies a predefined condition. Thus, the apparatus may include means, such as the processor 22 or the like, for determining the relationship between a threshold and a number of individuals with an emotional response that satisfies the predefined condition. The predefined condition may be defined in various manners and, in one embodiment, is a predefined emotional state or a range or family of related emotional states. For example, the predefined condition may be the emotional state of being happy with individuals having an emotional response of smiling or laughing being considered to satisfy the predefined condition, while users who have an emotional response of grimacing fail to satisfy the predefined condition. As another example, a predefined condition may relate to a predefined rate of change of the emotional state of an individual such that individuals satisfy this predefined condition in an instance in which their emotional responses change at a rate that satisfies the predefined rate of change. Alternatively the predefined condition may be defined to be a manifestation of an emotional state that is shared by each of the individuals such that the emotional response of the individual satisfies this predefined condition only in an instance in which each of the individuals has the same emotional response. In this embodiment, the manifestation of an emotional state may be considered to be shared by each of the individuals in an instance in which the manifestation of the emotional state of each of the individuals is the same or substantially the same, such as by being within a predefined range of one another.

As shown in block 64 of FIG. 7, the apparatus 20 is also configured to cause an action to be performed based upon the relationship between the threshold and the number of individuals with an emotional response that satisfies the predefined condition. Thus, the apparatus of this embodiment also includes means, such as the processor 22, the communication interface 26 or the like, for causing an action to be performed. The threshold may be defined in various manners including a number of individuals, a percentage of individuals or the like. The relationship between the threshold and the number of individuals with an emotional response that satisfies the predefined condition may be defined in various manners including the number of individuals with an emotional response that satisfies the predefined condition exceeding the threshold, falling below the threshold or equaling the threshold.

In one embodiment, the apparatus 20, such as the processor 22, may determine the relationship between the threshold and the number of individuals with an emotional response that satisfies the predefined condition by determining whether the number of individuals with a predefined emotional response is at least as great as the threshold. In an instance in which the number of individuals with a predefined emotional response is at least as great as the threshold, the apparatus, such as the processor, the communication interface 26 or the like, may cause an action to be performed.

Various actions may be performed based upon the relationship between the threshold and the number of individuals with an emotional response that satisfies the predefined condition. In the foregoing example in which the number of individuals with a predefined emotional response is at least as great as the threshold, the action that is caused to be performed may be the capturing of an image of the individuals. In this regard, the predefined emotional response may be a smile such that if the number of individuals who smile is at least as great as the threshold, the apparatus 20 may cause an image of the individuals to be captured. The resulting image may be further improved by not only requiring the number of individuals with the predefined emotional response, e.g., a smile, to be at least as great as the threshold, but by also requiring the number of individuals who have an attentional focus upon the location in which the camera resides to be at least as great as the threshold as described above. In this embodiment, the resulting image may therefore be captured only after determining that at least the threshold number, e.g., all, of the individuals are smiling and facing the camera.

In another example in which the predefined condition is laugher, the apparatus 10, such as the processor 22, may determine whether the number of individuals who are laughing are at least as great as a threshold. In an instance in which the number of individuals who are laughing are at least as great as the threshold, the apparatus 20, such as the processor 22, the communication interface 26 or the like, may direct that an image of the individuals be captured. For example, the individuals may be the patrons of a restaurant who are seated at a table and an image of the patrons may be captured while at least a threshold number of the patrons are laughing such that the image may thereafter be utilized for marketing or advertising purposes. While described above with the predefined condition being laughter, the foregoing example is also applicable with other predefined conditions. Instead of or in addition to capturing an image of the individuals, the action that is caused to be performed may be the capturing of an image of the location that is the subject of the attentional focus of the individuals once the emotional responses of the individuals have satisfied the predefined condition, such as laughter, fright, terror, shock, revulsion, etc., thereby capturing an image of the object that may have caused the emotional response. As yet another example, the action that is caused to be performed may be the recordation or the provision of information associated with satisfaction of the threshold, such as the time and date at which the threshold was surpassed and/or information identifying at least some of the individuals, e.g., the location of the individuals at the time that the threshold was surpassed, etc.

In another embodiment, the apparatus 20, such as a processor 22, may determine the relationship between the threshold and the number of individuals with an emotional response that satisfies the predefined condition by determining whether the number of individuals with a substantially similar emotional response is at least as great as the threshold. In this embodiment, the apparatus, such as a processor, communication interface 26 or the like, may then cause an action to be performed in response to the number of individuals with the significantly similar emotional response being at least as great as the threshold. Although various actions may be caused to be performed, the action to be performed in one embodiment may be the provision of information identifying the emotional responses of at least some of the individuals, thereby providing feedback as to a relatively common emotional response, such as to an advertisement, a movie, a performance, a speech or the like. Alternatively, the action to be performed in an instance in which at least a threshold number of individuals express significantly similar emotional responses may be to capture an image of at least some of the individuals.

In this embodiment, a significantly similar emotional response may be defined in one embodiment to be those emotional responses that are representative of the same emotional state, such as the emotional responses of laughter and smiling being representative of the same emotional state of being happy. Additionally or alternatively, the emotional responses may be assigned a value in accordance with a predefined scale that extends from very unhappy to neutral to very happy. In this embodiment, the significantly similar emotion responses may be defined to be those emotional responses that fall within a predefined range or window of one another upon the scale of emotional responses.

In another embodiment, the information identifying the emotional responses that is received by the apparatus 20, such as the processor 22, communication interface 26 or the like, may include information regarding a rate of change of an emotional state of each of the plurality of individuals. Alternatively, the information identifying the emotional responses that is received by the apparatus may be provided over the course of time such that the apparatus, such as the processor, may determine the rate of change of an emotional state of an individual from the changes in the emotional response of the individual over the course of time. In this embodiment, the predefined condition may be a predefined rate of change such that the apparatus, e.g., the processor or the like, may determine the number of individuals having an emotional response that experiences at least the predefined rate of change and may, thereafter, determine the relationship between the threshold and the number of individuals with an emotional response that satisfies the predefined rate of change. The apparatus, such as the processor, communication interface or the like, may then cause an action to be performed based upon the resulting relationship.

As described above, FIGS. 4-7 illustrate flowcharts of an apparatus, method, and computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 34 of an apparatus 20 employing an embodiment of the present invention and executed by a processor 32 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   receiving information identifying the attentional focus of each of a plurality of individuals at a common instance in time;
   determining, with a processor, that a determined quantity of individuals with a concurrent attentional focus on a same location satisfies at least a minimum threshold, based on at least one of a total number of individuals with a concurrent attentional focus on the same location, or a percentage of individuals with a concurrent attentional focus on the same location; and
   in response to determining that the determined quantity of individuals with the concurrent attentional focus on the same location satisfies at least the minimum threshold, causing an image to be captured.

2. A method according to claim 1 wherein, the image comprises at least one of one or more bodies, body portions, heads, or faces.

3. A method according to claim 1 wherein receiving information identifying an attentional focus comprises receiving head position information for each of the plurality of individuals.

4. A method according to claim 1 wherein receiving information identifying an attentional focus comprises receiving information from a wearable device worn by each of the plurality of individuals.

5. The method of claim 1, wherein the captured image comprises at least one of the plurality of individuals.

6. The method of claim 1, wherein the captured image comprises the plurality of individuals.

7. The method of claim 1, wherein the captured image comprises the same location on which the at least the minimum threshold quantity of individuals is focused.

8. An apparatus comprising at least one processor and at least one memory including computer program code, the at least one memory and the computer program code configured to, with the processor, cause the apparatus to at least:
   receive information identifying the attentional focus of each of a plurality of individuals at a common instance in time;
   determine that a determined quantity of individuals with a concurrent attentional focus on a same location satisfies at least a minimum threshold, based on at least one of a total number of individuals with a concurrent attentional focus on the same location, or a percentage of individuals with a concurrent attentional focus on the same location; and
   in response to determining that the determined quantity of individuals with the concurrent attentional focus on the same location satisfies at least the minimum threshold, cause an image to be captured.

9. An apparatus according to claim 8 wherein the image comprises at least one of one or more bodies, body portions, heads, or faces.

10. The apparatus of claim 8, wherein the captured image comprises at least one of the plurality of individuals.

11. The apparatus of claim 8, wherein the captured image comprises the plurality of individuals.

12. The apparatus of claim 8, wherein the captured image comprises the same location on which the at least the minimum threshold quantity of individuals is focused.

13. A computer program product comprising at least one non-transitory computer-readable storage medium having computer-executable program code portions stored therein, the computer-executable program code portions comprising program code instructions for:

receiving information identifying the attentional focus of each of a plurality of individuals at a common instance in time;

determining that a determined quantity of individuals with a concurrent attentional focus on a same location satisfies at least a minimum threshold, based on at least one of a total number of individuals with a concurrent attentional focus on the same location, or a percentage of individuals with a concurrent attentional focus on the same location; and in response to determining that the determined quantity of individuals with the concurrent attentional focus on the same location satisfies at least the minimum threshold, causing an image to be captured.

14. A computer program product according to claim 13, wherein the program code instructions further comprise program code instructions for, in response to determining that the determined quantity of individuals with the concurrent attentional focus on the same location satisfies at least the minimum threshold, cause an image of the location to be captured.

15. A computer program product according to claim 14 wherein the program code instructions for causing the action further comprise program code instructions for causing an image of at least some of the plurality of individuals to be captured, the image comprises at least one of one or more bodies, body portions, heads, or faces.

16. A computer program product according to claim 13 wherein the program code instructions for determining a relationship comprise program code instructions for determining a second determined quantity of individuals with an attentional focus that fails to include the same location, and wherein causing the action to be performed is further based on the second determined quantity of individuals with an attentional focus that fails to comprise the same location satisfying at least a second threshold.

17. The computer program product of claim 13, wherein the captured image comprises at least one of the plurality of individuals.

18. The computer program product of claim 13, wherein the captured image comprises the plurality of individuals.

19. The computer program product of claim 13, wherein the captured image comprises the same location on which the at least the minimum threshold quantity of individuals is focused.

\* \* \* \* \*